Patented Nov. 28, 1944

2,363,768

UNITED STATES PATENT OFFICE 2,363,768

MANUFACTURE OF PARA-XYLENE

Earl E. Zetterholm, Riverside, Ill., assignor to Universal Oil Products Company, Chicago, Ill., a corporation of Delaware No Drawing. Application March 31, 1943, Serial No. 481,272

5 Claims. (Cl. 260—673.5)

This invention relates to the cyclization of branched chain hydrocarbons and more particularly to a process for the manufacture of para-xylene.

One feature of my invention is to produce from a specific charging material a specific product while employing certain definite types of catalysts having a dehydrocyclization action on hydrocarbons, and under specific conditions of operation in regard to temperature, pressure and liquid hourly space velocities.

Another feature of my invention is a method of producing substantial yields of para-xylene with substantially no formation of ortho-xylene or ethylbenzene. This feature makes possible the easy separation of para-xylene from the reaction products.

Broadly, my invention is concerned with a process for the manufacture of para-xylene from a 2-ethylhexene hydrocarbon which comprises treating said hydrocarbon in the presence of a dehydrocyclization catalyst under dehydrocyclization conditions of temperature and pressure.

In a more specific embodiment my invention comprises the manufacture of para-xylene by contacting the vapors of 2-ethylhexene-1 with a chromia-alumina dehydrocyclization catalyst at dehydrocyclization conditions of temperature, pressure and space velocity.

The preferred catalysts which may be employed in conducting the process of my invention may comprise oxides of the elements in the left-hand columns of groups IV, V and VI of the periodic table. These elements comprise titanium, zirconium, cerium, hafnium, thorium, vanadium, columbium, tantalum, chromium, molybdenum, tungsten and uranium. It is preferable that these oxides be composited on or with carriers which may be of a siliceous character and structurally stable under the conditions of operation. Suitable materials are aluminum oxide and the oxides of the alkaline earth metals particularly magnesium oxide when these catalysts are prepared under proper conditions. Siliceous carriers comprising fuller's earth, various clays, various forms of silica and natural or artificial silicates may also be used. The catalyst composite may be prepared in various ways, either by impregnating the supports in granulated form with a solution of a salt of a volatile acid and then dehydrating and calcining to leave an oxide residue, or the hydroxide may be precipitated onto the granules by suspending them in a solution of salts and adding alkaline precipitants after which the suspended material consisting of refractory supports and adherent hydroxide is again dehydrated and calcined to leave a residue of catalytic oxide on the surface and in the pores of the support.

Not all the compounds possible from the above-mentioned elements have the same or equivalent catalytic value in accelerating the reaction involved in my invention, and when different oxides are used on different supports, optimum conditions for the formation of maximum yields of the desired compound will vary.

Three cyclization reactions yielding six carbon membered rings are possible starting with hydrocarbon compounds containing eight carbon atoms per molecule having a carbon skeleton corresponding to 3-methylheptane. This is shown by the following structural formulas in each of which the ring closure is indicated by a broken line:

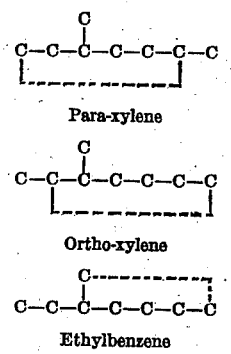

Para-xylene

Ortho-xylene

Ethylbenzene

I have found, however, that when employing 2-ethylhexane as the starting material in the process of my invention, para-xylene is formed with no measurable formation of either of the other two compounds taking place.

It is well-known that para-xylene when added to an aviation fuel blend increases its rich mixture response rating; that is, its performance rating when employing high fuel to air ratios such as are employed during take-off or any other conditions at which maximum power is desired from the engine. Therefore, my invention is of particular importance at the present time in view of the great demand for aviation fuel.

The preferred range of conditions at which my process may be conducted are temperatures of approximately 550–650° C., subatmospheric pressures of from about 50 millimeters of mercury to 150 millimeters of mercury and liquid hourly space velocities of from about 0.1–10, when employing dehydrocyclization catalysts of the chromia-alumina type. However, it will be found that my process may be conducted using other catalysts at temperatures within the range of 450–750° C. and subatmospheric pressures ranging from 10–760 millimeters of mercury.

The term "liquid hourly space velocity" as herein employed is defined as the units of liquid volume of charging material, measured at standard conditions, which are passed per hour through the reaction zone per unit volume of catalyst space.

The following example is introduced to further illustrate the character of my invention, although it is not intended for the purpose of unduly limiting its proper scope.

2-ethylhexene-1 was passed at a liquid hourly space velocity of 1.5 through a reactor containing a chromia-alumina type catalyst maintained at 600° C., at a pressure of 80 millimeters of mercury. A once-through yield of 33.9% of para-xylene was obtained, which upon employing recycle could be increased to approximately 43%. If any ortho-xylene or ethylbenzene was formed during the process the yields were so small as to defy all efforts to isolate them.

I claim as my invention:

1. A process for producing para-xylene which comprises subjecting 2-ethylhexene to the action of a dehydrocyclization catalyst at a temperature in the approximate range of 450–750° C., a pressure of from about 10 to about 760 mm. of mercury and a liquid hourly space velocity of from about 0.1 to about 10.

2. A process for producing para-xylene which comprises subjecting 2-ethylhexene to the action of a dehydrocyclization catalyst at a temperature in the approximate range of 550–650° C., a subatmospheric pressure of from about 50 to about 150 mm. of mercury and a liquid hourly space velocity of from about 0.1 to about 10.

3. A process for producing para-xylene which comprises subjecting 2-ethylhexene to the action of a chromia-alumina catalyst at a temperature in the approximate range of 450–750° C., a pressure of from about 10 to about 760 mm. of mercury and a liquid hourly space velocity of from about 0.1 to about 10.

4. A process for producing para-xylene which comprises subjecting 2-ethylhexene to the action of a chromia-alumina catalyst at a temperature in the approximate range of 550–650° C., a subatmospheric pressure of from about 50 to about 150 mm. of mercury and a liquid hourly space velocity of from about 0.1 to about 10.

5. A process for producing para-xylene which comprises subjecting 2-ethylhexene to the action of a chromia-alumina catalyst at a temperature of about 600° C., a pressure of about 80 mm. of mercury and a liquid hourly space velocity of about 1.5.

EARL E. ZETTERHOLM.